US012580358B2

(12) United States Patent
Likhachev et al.

(10) Patent No.: US 12,580,358 B2
(45) Date of Patent: Mar. 17, 2026

(54) ACTIVE OPTICAL FIBER WITH VARIABLE CROSS-SECTION AREA, METHOD OF PRODUCTION THE SAME (VARIANTS) AND AN OPTICAL SIGNAL AMPLIFIER BASED ON IT

(71) Applicant: Taper light, Moscow (RU)

(72) Inventors: Mikhail Evgenievich Likhachev, Krasnogorsk (RU); Konstantin Konstantinovich Bobkov, Moscow (RU)

(73) Assignee: Taper light, Moscow (RU)

( * ) Notice: Subject to any disclaimer, the term of this patent is extended or adjusted under 35 U.S.C. 154(b) by 779 days.

(21) Appl. No.: 17/917,236

(22) PCT Filed: May 29, 2020

(86) PCT No.: PCT/RU2020/000260
§ 371 (c)(1),
(2) Date: Mar. 31, 2023

(87) PCT Pub. No.: WO2021/242133
PCT Pub. Date: Dec. 2, 2021

(65) Prior Publication Data
US 2023/0231355 A1     Jul. 20, 2023

(51) Int. Cl.
*H01S 3/067* (2006.01)
(52) U.S. Cl.
CPC ...... *H01S 3/06733* (2013.01); *H01S 3/06716* (2013.01)
(58) Field of Classification Search
None
See application file for complete search history.

(56) References Cited

U.S. PATENT DOCUMENTS 5,339,374 A     8/1994   Murphy et al.
6,324,326 B1   11/2001   Dejneka et al.
(Continued)

FOREIGN PATENT DOCUMENTS

CN     108152883 A     6/2018
CN     108155547 A     6/2018
(Continued)

OTHER PUBLICATIONS

Bobkov, K. et al. (2017). "Sub-MW peak power diffraction-limited chirped-pulse monolithic Yb-doped tapered fiber amplifier," Opt. Express, vol. 25(22), pp. 26958-26972.
Bogatyrev, V. et.al. (1991). "A Single-Mode Fiber with Chromatic Dispersion Varying Along the Length," J. Light. Technology, vol. 9(5), pp. 561-566. 6 pages.
Bogatyrev, V.A. and A. Sysoliatin (2001). "An efficient method to produce fibers with outer diameter varying along the length." In Proc. of SPIE, vol. 4204, pp. 274-277.
(Continued)

*Primary Examiner* — Kristy A Haupt
(74) *Attorney, Agent, or Firm* — Mintz, Levin, Cohn, Ferris, Glovsky and Popeo, P.C.

(57)     ABSTRACT

The active optical fiber comprises an active core doped with at least one the active element and at least two reflective claddings; the cross-sectional area of the core and the cross-sectional area of the reflective cladding adjacent to the core continuously change along the length of the active optical fiber so that the maximum total area $S^{max}$ of the cross-sectional area of the core and the reflective cladding is at least twice as large as the minimum total area $S^{min}$ of the cross-sectional area of the core and the reflective cladding; at least one reflective cladding of said at least two reflective claddings comprises at least one modified section configured to reduce the power of the pump radiation propagating along the fiber in at least one reflective cladding after passing the (Continued)

(a)

USING AN OPTICAL FIBER WITH TWO REFLECTIVE CLADDINGS

↓

REMOVING THE PROTECTIVE CLADDING IN THE SELECTED REGION

↓

FORMATION OF A MODIFIED SECTION IN AT LEAST ONE REFLECTIVE CLADDING IN THE SELECTED REGION

↓

IMPLEMENTATION OF THE PROTECTIVE ELEMENT OUTSIDE THE MODIFIED SECTION (b)

USING AN OPTICAL FIBER WITH TWO REFLECTIVE CLADDING

↓

REMOVING THE PROTECTIVE CLADDING IN THE SELECTED REGION

↓

FORMATION OF A MODIFIED SECTION IN AT LEAST ONE REFLECTIVE CLADDING IN THE SELECTED REGION

↓

HEATING THE REGION ON ONE SIDE OF THE MODIFIED SECTION AND APPLYING A TENSILE FORCE TO THE FIBER FROM DIFFERENT SIDES OF THE HEATED REGION

↓

TAPER FORMATION

↓

FORMATION OF THE PROTECTIVE ELEMENT/ PROTECTIVE CLADDING OUTSIDE THE MODIFIED SECTION at least one modified section; the at least one modified section of the reflective cladding is located in that region along the axis of the optical fiber, where the total area Sint of the cross-section of the core and the reflective cladding adjacent to the core satisfies the following condition: $1.5 \times S^{min} \le S^{int} \le S^{max}$. The method for manufacturing the active optical fiber and the optical signal amplifier based on the active optical fiber are also proposed.

15 Claims, 11 Drawing Sheets

(56) References Cited

U.S. PATENT DOCUMENTS

| | | | | |
|---|---|---|---|---|
| 9,158,070 | B2 | 10/2015 | Farmer et al. | |
| 2018/0233875 | A1* | 8/2018 | Jollivet | H01S 3/094007 |

FOREIGN PATENT DOCUMENTS

| | | | |
|---|---|---|---|
| RU | 2674561 | C1 | 12/2018 |
| WO | WO-2009/043968 | A1 | 4/2009 |
| WO | WO-2021152202 | A1 * | 8/2021 ......... H01S 3/06708 |
| WO | WO-2021/242133 | A1 | 12/2021 |

OTHER PUBLICATIONS

Fedotov, A. et al. (2018). "Ultra-large core birefringent Yb-doped tapered double clad fiber for high power amplifiers," Opt. Express, 26(6), 6581-6592.

Filippov, V. et al. (2009). "600 W power scalable single transverse mode tapered double-clad fiber laser," Opt. Express, vol. 17 (3), pp. 1203-1214.

International Search Report issued in International Application No. PCT/RU2020/000260, mailed Feb. 25, 2021 (Feb. 25, 2021). 2 pages. [English language and Russian language].

Roy, V. et al. (2017). "Yb-doped large mode area tapered fiber with depressed cladding and dopant confinement," Proc. of SPIE 1008314-1-1008314-6. 7 pages.

V.B. Veinberg and D.K. Sattarov, Waveguide Optics, Chap. 5 (in Russian), Mashinostroenie, Leningrad, 1977, pp. 128-148.

Zhu, Y. et al. (2018). "Yb-doped large mode area fiber for beam quality improvement using local adiabatic tapes with reduced dopant diffusion," Opt. Express, vol. 26 (13), pp. 17034-17043.

* cited by examiner (e)

(f)

(g)

(h)

(a)

(b)

(c)

(d)

(e)

(f)

ACTIVE OPTICAL FIBER WITH VARIABLE CROSS-SECTION AREA, METHOD OF PRODUCTION THE SAME (VARIANTS) AND AN OPTICAL SIGNAL AMPLIFIER BASED ON IT

TECHNICAL FIELD

This invention relates to optical fibers, and more particularly, it concerns the design of an active optical fiber with variable cross-section area, the method of production the same and the amplifier of optical signal based on it. The active optical fiber with variable cross-section area provides increasing the maximum achievable average and/or peak output power of output signal in amplifiers based on the active optical fiber.

BACKGROUND OF THE INVENTION

Fiber lasers and amplifiers are widely used in industrial applications, in medicine and fundamental research due to the excellent quality of the output radiation, a compact size, a maintenance-free operation, and a relatively low price.

Nowadays, the main progress in increasing the average and peak output power of fiber lasers is achieved through the use of active optical fibers having a double reflective cladding, i.e. the fibers comprising: a core; a first reflective cladding adjacent to the core and having the refractive index less than the refractive index of the core in order to meet the total internal reflection condition at the core—the first cladding boundary for the radiation propagating in the core; a second reflective cladding, located outside the first reflective cladding and adjacent to the first reflective cladding and having the refractive index less than the refractive index of the first the reflective cladding adjacent to the core. The presence of the second reflective cladding ensures the propagation of the multimode radiation inside the first reflective cladding along the axis of the optical fiber and allows introducing a radiation from powerful pump multimode sources with low brightness (that is insufficient to couple pump radiation directly into the core of the optical fiber) into the first reflective cladding, while this radiation is absorbed in the active core of the optical fiber, and provides amplification of the signal propagating in the core.

The field of application of such lasers is constantly expanding, but in some cases the use of standard optical fibers with double reflective cladding does not allow achievement of acceptable efficiency, beam quality, peak power, etc. in fiber lasers based on these optical fibers.

In a number of cases, using of active fibers with double reflective cladding and gradually increasing cross-section area of the core $S_{core}$ and the area of the first reflective cladding $S_{1clad}$ allows to improve characteristics of fiber lasers, for example, to increase the efficiency of the laser based on such fibers (see, for example, U.S. Pat. No. 6,324,326 B11) or increase the maximum achievable peak power (see, for example, A. Fedotov et. al. "Ultra-large core birefringent Yb-doped tapered double clad fiber for high power amplifiers", Opt. Express, Vol. 15 26(6), pp. 6581-6592, 2018; or K. Bobkov et. al "Sub-MW peak power diffraction-limited chirped-pulse monolithic Yb-doped tapered fiber amplifier", Opt. Express, Vol. 25(22), pp. 26958-26972, 2017).

In such systems, the core at the thin end of the fiber, having the smallest cross-section area of the $S_{core}^{min}$ and the reflective cladding adjacent to core of the $S_{1clad}^{min}$, supports the propagation of only the fundamental transverse mode.

Such operation mode of the optical fiber is achieved by meeting a single-mode condition of the core on the thin end, which is determined for a fiber with a step profile of the refractive index by the following condition $$\lambda > 1.306 \cdot D \cdot \sqrt{2 \cdot \Delta n \cdot n},$$

where: D is the diameter of the core, $\Delta n$ is the difference between the refractive indices of the core and the first reflective cladding, n is the refractive index of the first reflective cladding.

In other case, if said condition is not met, the single-mode operation mode is achieved through an increase of the optical losses of modes other than the fundamental mode when the signal passes along the initial part of the fiber near its thin end (for example, V. Roy et. al. "Yb-doped large mode area tapered fiber with depressed cladding and dopant confinement", Proc. of SPIE 1008314, 2017) or by choosing a method for coupling of a signal into the core that provides only the fundamental mode excitation.

If the change in the diameter D of the core along the length of the fiber satisfies the condition:

$$\left| \frac{dD}{dz} \right| \leq \frac{D \cdot (\beta_1 - \beta_2)}{2 \cdot \pi},$$

where: $\beta_1$ and $\beta_2$ are the propagation constants of the fundamental mode and the first high order mode correspondingly, z is the coordinate along the axis of the fiber, then the signal radiation coupled into the core at the thin end of the fiber (having the smallest area of the core $S_{core}^{min}$) propagates towards the thick end (having the large area of the core $S_{core}^{max}$) remaining mainly in the fundamental transverse mode.

As a result, the high quality of the amplified signal at the output of the thick end of the fiber is ensured when the amplified signal propagates in the direction from the thin end of the fiber to the thick end, and low losses are provided when the amplified signal propagates in the opposite direction, i.e. in the direction from the thick end of the fiber to the thin end.

It is preferable to couple the pump radiation through the thick end of the fiber, where the total area of the core and the first reflective cladding $S^{max} = S_{core}^{max} + S_{1clad}^{max}$ is increased relative to the total area of the core and the first reflective cladding $S^{min} = S_{core}^{min} + S_{1clad}^{min}$ on the side of the thin end of the fiber.

The use of the thick end of the optical fiber to couple the pump radiation makes it possible to increase the maximum pump power that can be coupled into the fiber (V. Filippov et. al. "600 W power scalable single transverse mode tapped double-clad fiber laser", Opt. Express, Vol. 17 (3), pp. 1203-1214, 2009). In addition, in case the amplified signal is coupled out through the thick end, the increased area of the core $S_{core}^{max}$ at the thick end of the fiber allows reducing the power density of the amplified signal, and thereby to reduce the nonlinear effects impact, i.e., stimulated Raman scattering, stimulated Brillouin scattering, four-wave mixing, self-phase modulation, etc. on the amplified signal in comparison with standard single-mode optical fibers (A. Fedotov et. al. "Ultra-large core birefringent Yb-doped tapered double clad fiber for high power amplifiers", Opt. Express, Vol. 26(6), pp. 6581-6592, 2018; U.S. Pat. No. 9,158,070 B2; K. Bobkov et. al. "Sub-MW peak power diffraction-limited chirped-pulse monolithic Yb-doped tapered fiber amplifier", Opt. Express, Vol. 25 (22), pp. 26958-26972, 2017).

The change in the areas of the core and the cladding along the length of the fiber can be implemented either during the drawing of the fiber from a preform on a drawing tower (V. Bogatyrev et. al. "A Single-Mode Fiber with Chromatic Dispersion Varying Along the Length", J. Light. Technology, Vol. 9(5), pp. 561-566, 1991; V. Bogatyrev and A. Sysoliatin "An efficient method to produce fibers with outer diameter varying along the length", in Proc. of SPIE, Vol. 4204, pp. 274-277, 2001), or by modification of an already drawn regular fiber with a constant cross-section area along its length using special fiber processing systems (see, for example, U.S. Pat. No. 5,339,374 A; Zhu Yuan et. al. "Fiber for beam quality improvement using local adiabatic tapes with reduced dopant diffusion", Opt. Express, Vol. 26 (13), pp. 17034-17043, 2018). In all these cases, the ratio of the diameter of the core and the characteristic size of the adjacent reflective cladding, for example, its diameter remains constant along the length of the fiber.

At the same time, both the optical fiber with length-varying area of the core and the first reflective cladding, mentioned above and the one known from prior art, have a significant drawback consisting in that the numerical aperture of the pump radiation coupled at the thick end of the fiber increases as it spreads towards the thin end of the fiber in accordance with the law:

$$NA(z) = NA_{input} \cdot \sqrt{\frac{S^{input}}{S(z)}},$$

where: NA(z) is the pump numerical aperture at the point with the z coordinate along the axis of the fiber; S(z) is the total cross-sectional area of the core and the first reflecting cladding in the specified z coordinate; $S^{input}$ is the total cross-sectional area of the core and the first reflective cladding at the point of coupling of the pump radiation; $NA_{input}$ is the numerical aperture of the pump radiation coupled into the first reflective cladding at the thick end.

At some point of the optical fiber, the numerical aperture of the pump radiation NA(z) may exceed the numerical aperture of the first reflective cladding determined by the equation $$NA_{1clad} = \sqrt{(n_{1clad})^2 - (n_{2clad})^2},$$

where: $n_{1clad}$ is the refractive index of the first reflective cladding, and $n_{2clad}$ is the refractive index of the second reflective cladding.

When the condition $NA(x) > NA_{1clad}$ is met, the pump radiation begins to leak from the first reflective cladding of the optical fiber into the second reflective cladding. This effect is referred to as the vignetting (V. B. Veinberg and D. K. Sattarov, Waveguide Optics, Chap. 5 (in Russian), Mashinostroenie, Leningrad, 1977; Valery Filippov et. al. In "600 W power scalable single transverse mode tapered double-clad fiber laser", Opt. Express, Vol. 17(3), 1203-10 1214, 2009).

The pump radiation leaked into the second reflective cladding of the fiber due to the vignetting effect, leads to its heating, as well as to heating of surrounding materials, for example, the outer protective coating, the spool on which the fiber is wound, or thermal grease used to remove the heat generated by the fiber when the optical radiation is amplified in the presence of pumping. The generated heat, if a certain level of power of the coupled pump radiation is exceeded, leads to destruction of the optical fiber or deterioration of its amplifying properties due to degradation of its outer cladding, or the materials surrounding the outer cladding.

Therefore, it is the vignetting effect that limits the maximum level of pump power that can be coupled into the above mentioned optical fiber without the risk of losing its efficiency and in such a way the vignetting effect limits the maximum power level of the amplified signal in the optical fiber design with varying areas of the core and the first reflective cladding.

It should be noted, that in a number of applications of active optical fibers with a continuously varying cross-sectional area, there is another problem: the signal amplification can occur not only in the thick part of the fiber, which has an increased cross-sectional area of the core, but also in the thin part of the fiber, where the cross-sectional area of the core is much smaller, i.e. close to or equal to the cross-sectional area of the core at the thin end of the fiber.

In this case, the nonlinear effects impact on the amplified signal is much higher, compared to the case when the fundamental mode amplification occurs only in the thick part of the fiber (we mean the part of the fiber, where the total area of the core and the adjacent reflective cladding $S > 1.5 \times S^{min}$).

SUMMARY OF THE INVENTION

It is therefore a general object of this invention to provide an active optical fiber with a varying cross-sectional area of the core and adjacent reflective cladding, that overcomes these and other disadvantages found in the aforementioned prior art and that is able to operate without degradation of its characteristics, including the integrity of the optical fiber itself, for a long time at a high level of pump power coupled into the active optical fiber from its thick end into the reflective cladding adjacent to the core and reducing, up to complete elimination, the pump power reaching the thin part of the optical fiber, i.e. to that part where the total cross-sectional area of the core and the cladding is less than $1.5 \times S^{min}$, provided that the pump radiation is coupled into the first reflective cladding at the thick end. In this case, the thick end of the optical fiber means the one of the two ends, the distance from which along the axis of the optical fiber to the nearest part of the optical fiber with the maximum value of the total cross-sectional area of the core and adjacent cladding $S^{max}$ is less than the distance along the axis to the nearest section of the optical fiber with the minimum total cross-sectional area of the core and adjacent cladding $S^{min}$.

Another object is to provide a method of manufacturing the active optical fiber with a variable cross-sectional area that is able to operate at a high level of pump power coupled into the active optical fiber at its thick end for a long period of time.

Another object is to provide an optical amplifier based on the active optical fiber with cross-sectional areas of the core and adjacent reflective cladding varying along its length, and provide an increase in the maximum achievable average power and an increase in the maximum achievable peak power of the amplified radiation.

The ability to couple high-power pump radiation into the optical fiber allows increasing the maximum-achievable average power of the amplified signal in an optical amplifier based on the optical fiber. In the amplifier based on the optical fiber, wherein the signal propagates from the thin end to the thick end, a decrease (or complete elimination) of the pump power that reaches the thin part of the optical fiber, where the total cross-sectional area of the core and cladding is less than $1.5 \times S^{min}$, leads to a decrease in the rate of signal power growth in the thin part of the optical fiber and the main signal power growth occurs in the thick part of the optical fiber, where the core area is increased. This reduces the impact on the amplified signal of at least one of the nonlinear effects: stimulated Raman scattering, stimulated Brillouin scattering, four-wave mixing, self-phase modulation, and increases the maximum achievable peak power of the amplified signal at the output of the amplified based on the optical fiber.

The object was solved by creating an active optical fiber comprising an active core doped with at least one active element selected from a group consisting of elements: erbium, ytterbium, thulium, neodymium, holmium, praseodymium, dysprosium, bismuth; and at least two reflective claddings;

the cross-sectional area of the core and the cross-sectional area of the reflective cladding adjacent to the core vary along the length of the active optical fiber so that the maximum total area $S^{max}$ of the cross-sectional area of the core and the reflective cladding is at least twice as large as the minimum total area $S^{min}$ of the cross-sectional area of the core and the reflective cladding;

at least one reflective cladding of said at least two reflective claddings comprises at least one modified section configured to reduce the power of the pump radiation propagating along the active optical fiber in said at least one reflective cladding after passing the specified at least one modified section;

the specified at least one modified section of the reflective cladding is located in that region along the axis of the optical fiber where the total area $S^{int}$ of the cross-section of the core and the reflective cladding adjacent to the core satisfies the following condition:

$$1.5 \times S^{min} < S^{int} \leq S^{max}.$$

Preferably, the reflective cladding located on the modified section has a refractive index higher than the refractive index of the rest of the reflective cladding.

Preferably, at least one modified section of the reflective cladding comprises an optical inhomogeneity that ensures the scattering of the radiation propagating through the reflective cladding.

Preferably, the modified section extends along the axis of the optical fiber and said modified section is located in cross-section along at least a part of the perimeter of the reflective cladding and occupies at least a part of the cross-section of the reflective of the reflective cladding in the at least one local region.

Preferably, the at least one modified section is located at each of the ends of the optical fiber at a distance of more than 3 cm.

Preferably, the core is configured to maintain the propagation of a single transverse optical mode (the fundamental one) at said of one of the ends.

Preferably, the optical fiber additionally further comprises an external protective coating made of polymer, metal, carbon, or any combination of them.

Preferably, optical fiber further comprises a protective element located on the outer side of the region of the reflective cladding comprising the modified section, said protective element is configured to protect the modified section from mechanical damage and/or from overheating, by removing the heat released during the absorption of the pumping radiation by the modified section and the outer protective coating.

Preferably, the at least one reflective cladding is radially asymmetric in a cross-section perpendicular to the axis of the optical fiber.

Preferably, one of the reflective claddings comprises elements having the coefficient of thermal expansion (CTE) that differs from the CTE of the material of the reflective cladding adjacent to the core.

Preferably at least one modified section of the reflective cladding of the said modified sections is located at the thin end of the optical fiber, in the region where the total cross-sectional area $S^{int}$ of the core and the reflective cladding adjacent to the core satisfies the following condition: $S^{int} \leq 1.5 \times S^{min}$.

The object was also solved by creating a method for manufacturing the optical fiber according to claim 1, comprising the steps of:

using an optical fiber comprising the active core and at least two reflective claddings, whereas the cross-sectional area of the core and the cross-sectional area of the reflective cladding adjacent to the core are continuously changing along the length of the optical fiber so that the maximum total area $S^{max}$ of the cross-sectional area of the core and the reflective cladding is at least twice as large as the minimum total area $S^{min}$ of the cross-sectional area of the core and the reflective cladding, selecting an area along the axis of the optical fiber where the total area Sint of the cross-section of the core and the reflective cladding adjacent to the core satisfies the following condition:

$$1.5 \times S^{min} < S^{int} \leq S^{max},$$

modifying at least one section of the at least one reflective cladding of the fiber in the specified area to ensure the reduction of the power of the pump radiation propagating along the optical fiber in the at least one reflective claddings after passing the modified section, forming a protective coating for the at least one modified section, said protective coating is configured to protect said modified section from a mechanical damage and from overheating by removing the heat generated by the absorption of optical radiation in the area of the at least one modified section and in the area of the protective coating of the at least one modified section.

Preferably, the step of modifying is implemented by one of the following:

forming optical defects in the reflective cladding to ensure scattering of the propagating radiation;

removing the reflective cladding and applying a material to the removal site, whereas the material having a refractive index greater than the refractive index of the removed reflective cladding;

removing the reflective cladding and applying a material to the removal site, whereas the material serves for absorbing the pump radiation.

The object was also solved by creating a method for manufacturing the active optical fiber according to claim 1, the method comprising the steps of:

using the optical fiber comprising an active core and the at least two reflective claddings, selecting a region long the length of the optical fiber between its ends, removing one of the protective coatings or at least one of the at least two reflective claddings in the selected region, modifying at least one section of the at least one reflective cladding in the said region of the optical fiber by at least one of:

creating optical defects in the said reflective cladding, said defects provide scattering of the propagating pump radiation;

replacing the reflective cladding and applying a material having a refractive index greater than the refractive index of the reflective cladding in the removed site; removing the reflective cladding and applying a material absorbing the pump radiation to the removed site, heating the optical fiber on the one side of the selected region where the modified section is formed to the softening, applying a mechanical force to the sections of the optical fiber on different sides of the heated section and forming a section with a changing diameter, so that the diameter of the core and the diameter of the reflective cladding adjacent to the core continuously change along the length of the said section so that the cross-sectional area of the core and the reflective cladding adjacent to the core at one end of the said section is at least twice as large as the cross-sectional area of the core and the reflective cladding adjacent to the core at the other end of the section, performing at least one of the following:

restoring the protective coating in the said region of the optical fiber;

creating a protective element in the said region of the optical fiber to protect the optical fiber against mechanical damage and to remove heat.

The object was solved by implementation of an optical amplifier, consisting of:

the optical fiber according to claim 1, a source of the amplified signal, a source of pump radiation, means for coupling/decoupling of an amplified signal to the core, located on both sides of the optical fiber, means for coupling of the pump radiation in the core and/or the reflective cladding adjacent to the core of the optical fiber located at least at one end of the optical fiber.

The technical effect achieved by the claimed invention consists in the fact that at least one modified section formed in at least one reflective cladding will reduce the power of the pump radiation propagating along the fiber from the thick end to the thin end in the at least one reflective cladding after passing the modified section, which in turn will reduce or completely eliminate overheating and destruction of the optical fiber due to the vignetting effect, as well as provide control of the gain profile, this, in turn, will provide the possibility to increase the average and peak power while maintaining the single-mode operation.

By using the active optical fiber as part of a fiber amplifier, it becomes possible to increase the maximum achievable output average and peak power of the amplified radiation while maintaining its characteristics, i.e., the output beam quality, the radiation spectrum, etc., in comparison to the use of optical fibers known from the state of the art.

BRIEF DESCRIPTION OF THE DRAWINGS

These and other features together with the manner of operation thereof will become apparent from the following detailed description when taken in conjunction with the accompanying drawings.

DESCRIPTION OF THE PREFERRED EMBODIMENTS

Figure 1:
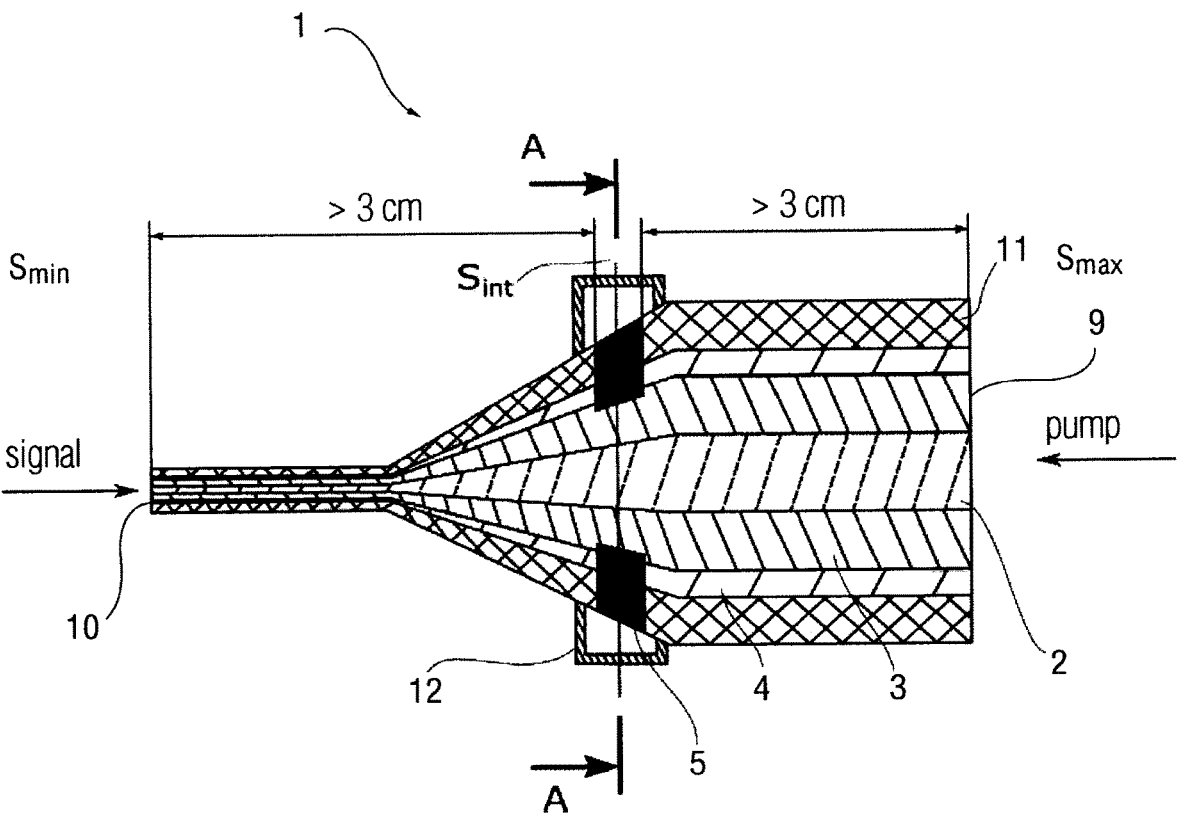
FIG. 1 shows the active optical fiber (axial section) with a variable cross-sectional regions of the core and the first reflective cladding comprising the modified section (shown in black), according to the invention.

The optical fiber 1 (FIG. 1) comprises active core 2 doped with at least one active element selected from a group consisting of the following elements: erbium, ytterbium, thulium, neodymium, holmium, praseodymium, dysprosium, bismuth. The optical fiber 1 comprises at least two reflective claddings 3, 4. FIG. 1 shows two reflective claddings 3 and 4.

The cross-sectional area of the core 2 and the cross-sectional area of the reflective cladding 3 adjacent to the core vary along the length of the optical fiber 1, so that the maximum total area $S^{max}$ of the cross-sectional area of the core and the reflective cladding is at least twice as large as the minimum total area $S^{min}$ of the cross-sectional area of the core 2 and the reflective cladding 3.

Figure 2:
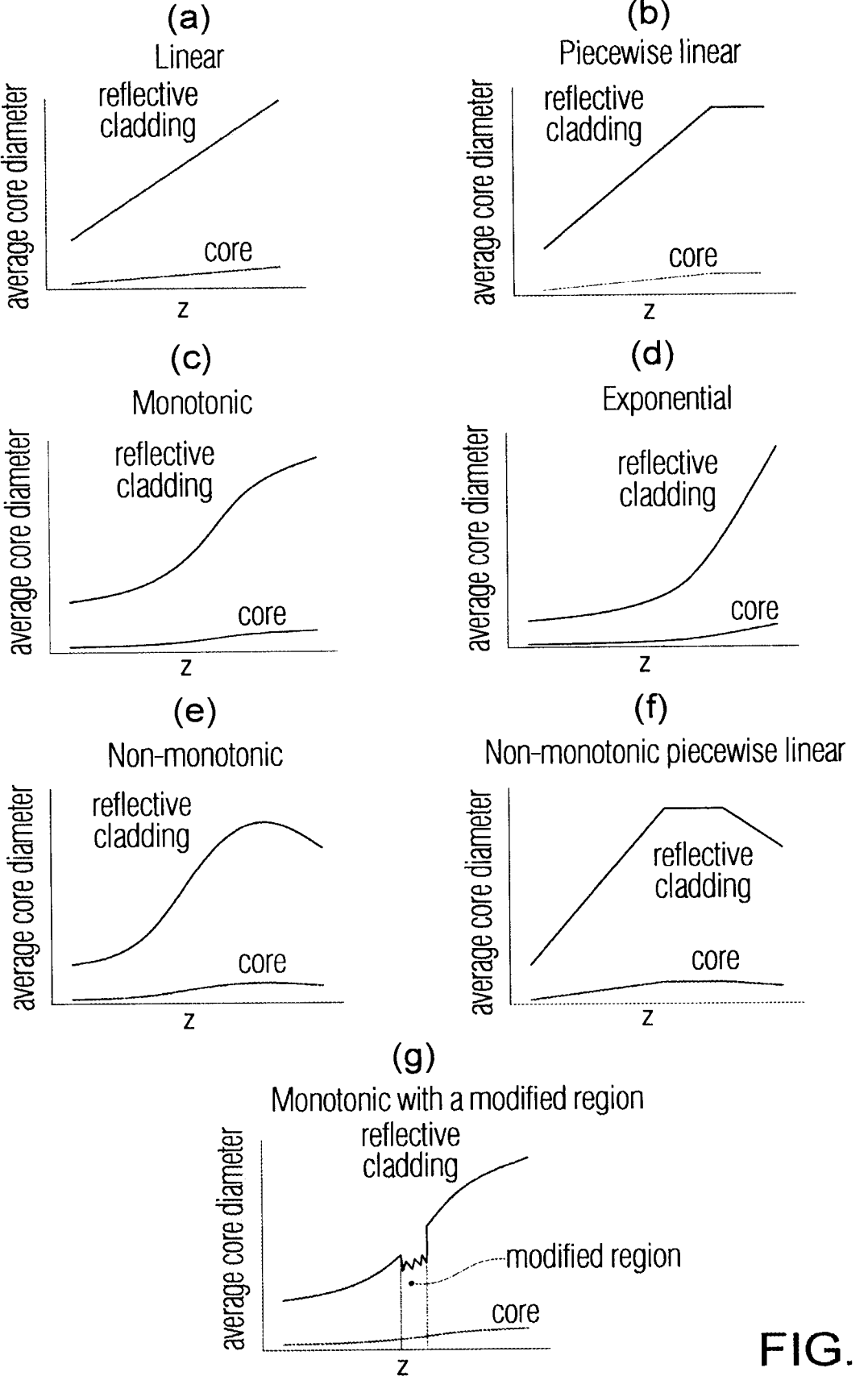
FIG. 2 shows various dependences of the average core diameters (lower curve) and the adjacent reflective cladding of the optical fiber (upper curve) from the z coordinate along the optical fiber axis: linear (a), piecewise linear (b), monotonic (c), exponential (d), non-monotonic (e), non-monotonic piecewise linear (f), monotonic with a modified region (g).

FIG. 2 *a, b, c, d, e, f, g* shows the possible dependences of the average core diameter Dcore(z) (lower curve) and the average diameter D1st(z) of the adjacent reflective cladding 3 on the z coordinate along the optical fiber axis, determined by the conditions:

$$Dcore(z) = 2 \cdot \sqrt{Score(z)/\pi},$$

$$D1st(z) = 2 \cdot \sqrt{S(z)/\pi},$$

where: Score(z) is the cross-sectional area of the core 2; S(z) is the total cross-sectional area of the core 2 and the adjacent reflective cladding 3.

The rate of changing of the average diameter of the core 2 satisfies the condition:

$$\left| \frac{dDcore(z)}{dz} \right| \le \frac{Dcore(z) \cdot (\beta_1 - \beta_2)}{2 \cdot \pi},$$

where: $\beta_1$ and $\beta_2$ are the propagation constants of the fundamental mode and the first high order mode, z is the coordinate along the axis of the optical fiber; and the change in the average diameter of the reflective cladding adjacent to the core 3 is smooth at least outside the modified area.

At the same time, FIG. 2*a* shows a linear dependence, FIG. 2*b* shows piecewise linear dependence, FIG. 2*c* shows a monotone dependence, FIG. 2*d* shows the exponential dependence, FIG. 2*e* shows a non-monotonic dependence, FIG. 2*f* shows a non-monotonic piecewise linear dependence, FIG. 2*g* shows a monotonic dependence with the modified region.

At least one reflective cladding 3 or 4 (FIG. 1) of the optical fiber 1 comprises at least one modified section 5 configured to reduce the power of the pump radiation propagating along the optical fiber 1 in at least one reflective cladding 3 or 4 after passing the modified section 5.

Said modified section 5 of the reflective cladding 3 or 4 is located in the region along the axis of the optical fiber, where the total area Sint of the cross-section of the core 2 and the reflective cladding 3 adjacent to the core 2 satisfies the following condition:

$$1.5 \times S^{min} < S^{int} \le S^{max}.$$

Preferably, the modified section 5 of the optical fiber 1 provides the total optical losses from all the modified sections of the optical fiber (not shown in FIG. 1) exceeding 0.5 dB when the pump radiation propagates along the optical fiber through the reflective cladding 3 closest to the core 2.

Figure 3:
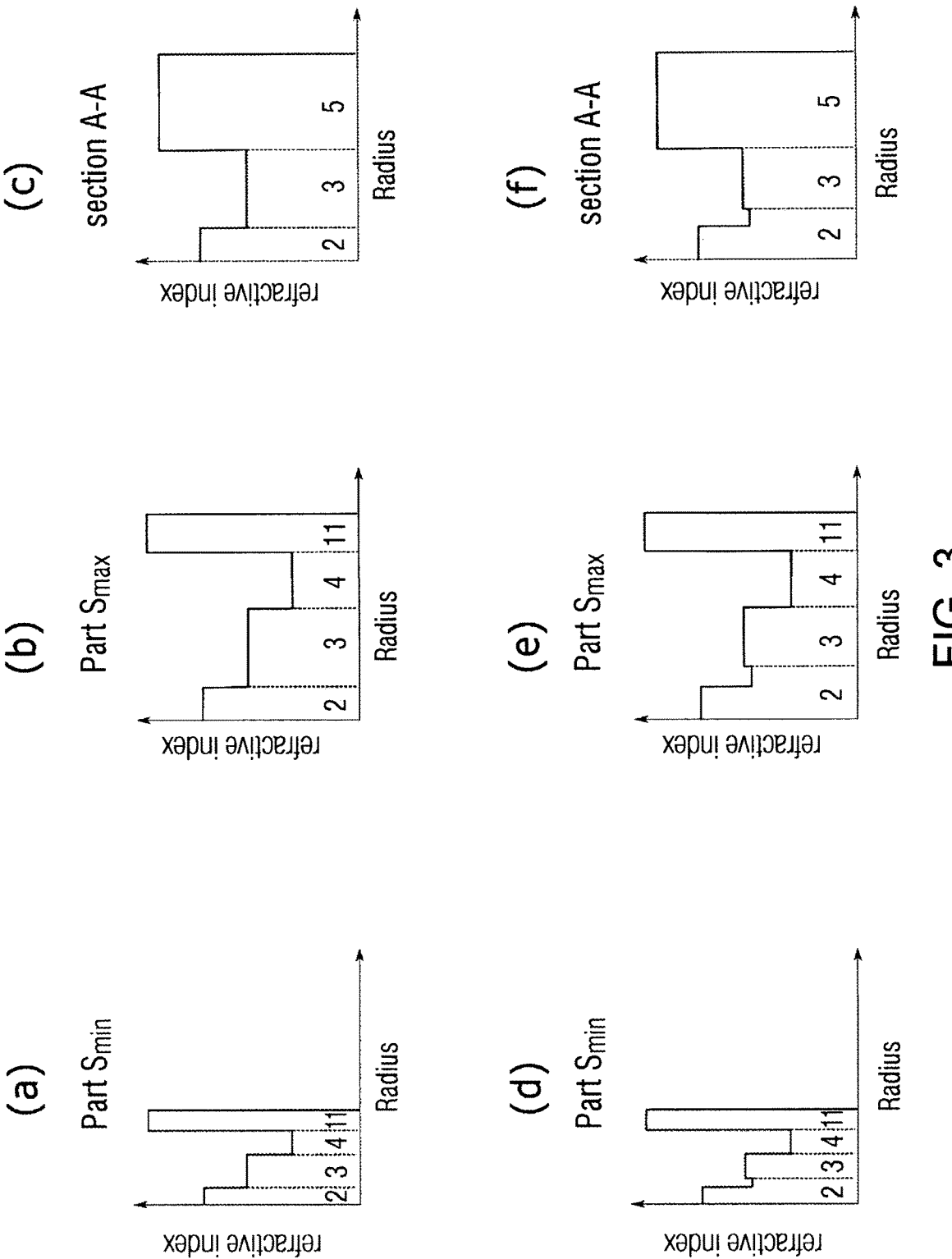
FIG. 3 *a, b, c, d, e, f* depict variants of the refractive index profile of the active optical fiber in the $S^{min}$, $S^{max}$, $S^{int}$ regions in the section A-A of the fiber, according to the invention.

FIG. 3 *a, b, c, d, e, f* show examples of the refractive index profiles of the optical fiber 1 in different cross-sections for the case when the reflective cladding 4 in the modified section 5 has a refractive index higher than the refractive index of the rest of the reflective cladding 4: from the thin end (FIG. 3*a* and FIG. 3*d*), on the side of the thick end (FIG. 3*b* and FIG. 3*e*), in the section where the modified section is present (FIG. 3*c* and FIG. 3*f*). Position numbers 2, 3, 4, 5, and 11 in FIG. 3 correspond to elements 2,3,4,5,11 in FIG. 1.

Figure 4:
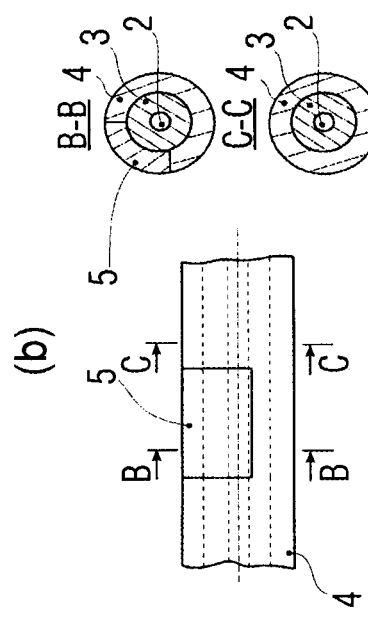
FIG. 4 shows possible implementation options of the modified section in the reflective cladding on the section of the active optical fiber, according to the invention.
Figure 4:
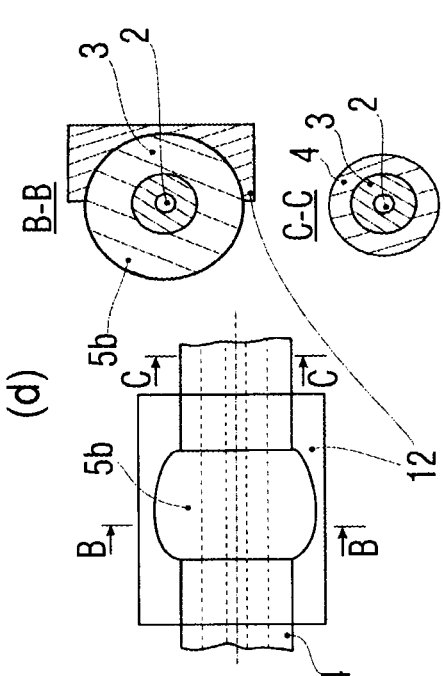
Figure 4:
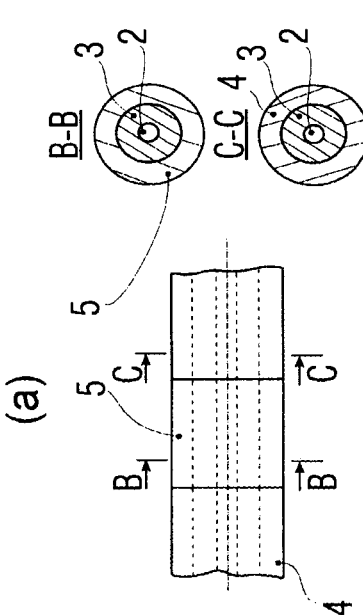
Figure 4:
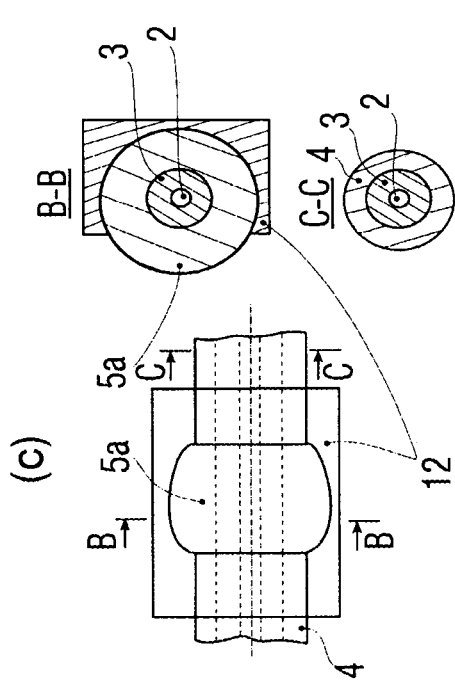
Figure 4:
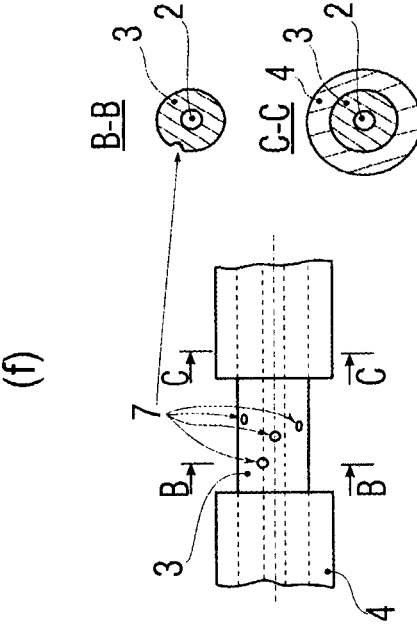
Figure 4:
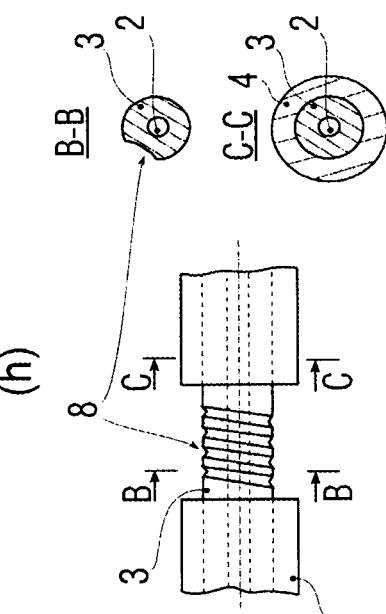
Figure 4:
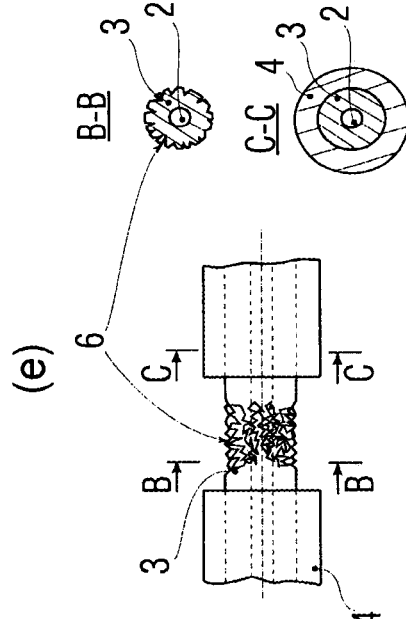
Figure 4:
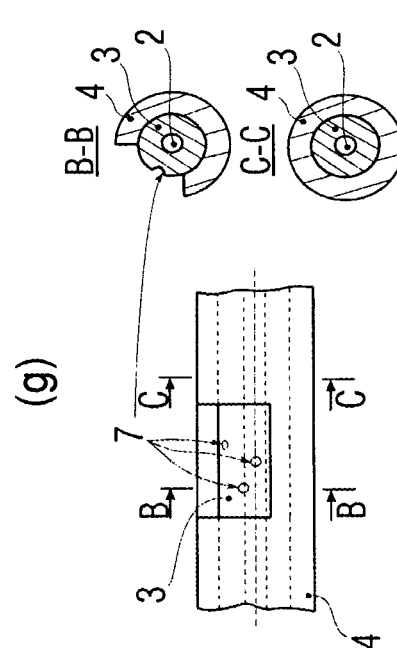

FIG. 4 *a, b, c, d, e, f, g, h* show the possible variants of implementation of the modified section 5.

The modified section 5 (FIG. 4*a*) has the shape in cross-section B-B identical to the shape in the cross-section C-C of the reflective cladding 4, said modified section 5 is located along the axis of the optical fiber and is made of a material having the refractive index higher than the refractive index of the reflective cladding 4.

The modified section 5 (FIG. 4*b*) occupies the part of the cross-section of the reflective cladding 4 along the optical fiber and is made of a material with the refractive index higher than the refractive index of the reflective cladding 4.

The cross-sectional area of the modified section 5*a* (FIG. 4*c*) exceeds the cross-sectional area of the reflective cladding 4, and the modified section is made of a material having the refractive index higher than the refractive index of the reflective cladding, and is preferably surrounded on the outside by the protective element 12 that provides protection against mechanical damage and heat dissipation.

The modified section 5*b* (FIG. 4*d*) is made of a material that absorbs optical radiation and is enveloped on the outside by the protective element 12, which provides protection against mechanical damage and heat dissipation.

The modified section 5 (FIG. 4*e*) of the reflective cladding 3 comprises the optical inhomogeneity 6 in the form of surface roughness, which ensures the scattering of the radiation propagating through the reflective cladding 3. Preferably, the modified section 5 is in contact with air from the outside.

The modified section 5 of the reflective cladding 3 (FIG. 4*f*) comprises the optical inhomogeneity 7 in the form of one or more recess, that ensures the scattering of radiation propagating through the reflective cladding 3 and the modified section 5 is preferably in contact with air from the outside.

The modified section 5 of the reflective cladding (FIG. 4*g*) comprises the optical inhomogeneity 7 in the form of one or more recess that provide scattering of radiation propagating through the reflective cladding 3 located along the perimeter of the segment of the reflective cladding 3. Preferably, the modified section 5 is in contact with air from the outside.

The modified section 5 of the reflective cladding (FIG. 4*h*) comprises the optical inhomogeneity in the form of the groove 8 that ensures the scattering of radiation propagating through the reflective cladding 3. Preferably, the modified section 5 is in contact with air from the outside.

Preferably, the modified section 5 (FIG. 1) is located at the distance of more than 3 cm from each of the ends 9 and 10 of the fiber 1.

Preferably, the core 2 of the optical fiber is configured to maintain propagation of the single optical transverse mode at one of the ends 10 of the fiber 1. Preferably, to increase the diameter of the core, which maintain the single-mode propagation at the end 10, the core 2 is made of several layers whereas each layer has the different refractive index, while the outer layer of the core 2 has the refractive index less than that of the adjacent reflective cladding 3 (FIG. 3 *d, e* and *f*).

Preferably, the optical fiber 1 (FIG. 1) further comprises the external protective coating 11 made of a material such as a polymer, metal or carbon.

As mentioned above, preferably the protective element 12 in the region of the reflective cladding 4, comprising the modified section 5, is placed on the outer side, the protective element 12 is configured to protect the modified section 5 from mechanical damage and/or overheating heat dissipation generated when the pump radiation is absorbed by the modified section 5 and the outer protective coating 11 and the protective element 12. The protective element 12 in the described embodiment has a form of a box.

FIG. 5*a* shows a radially symmetrical shape of one of the claddings 13 of the optical fiber 1. Preferably, the outer reflective cladding has such a form; for example, the cladding 4 in FIG. 1, and/or the protective coating 11.

Figure 5:
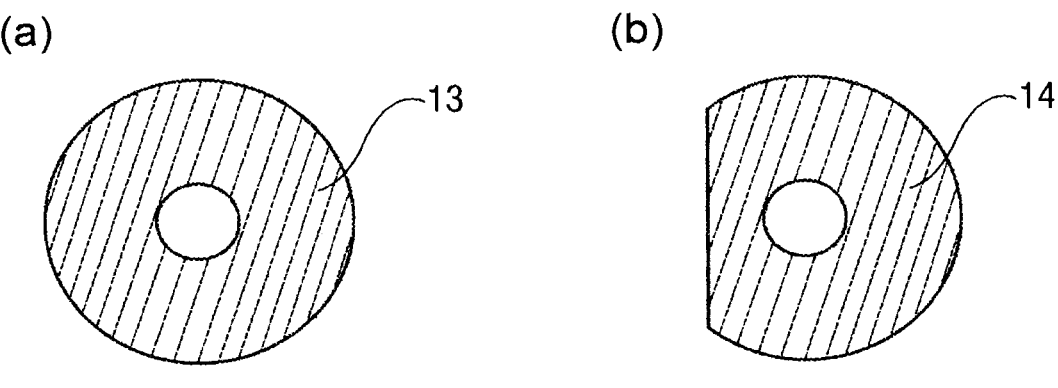
FIG. 5 *a, b, c, d, e, f* show possible cross-sections of one of the reflective claddings.
Figure 5:
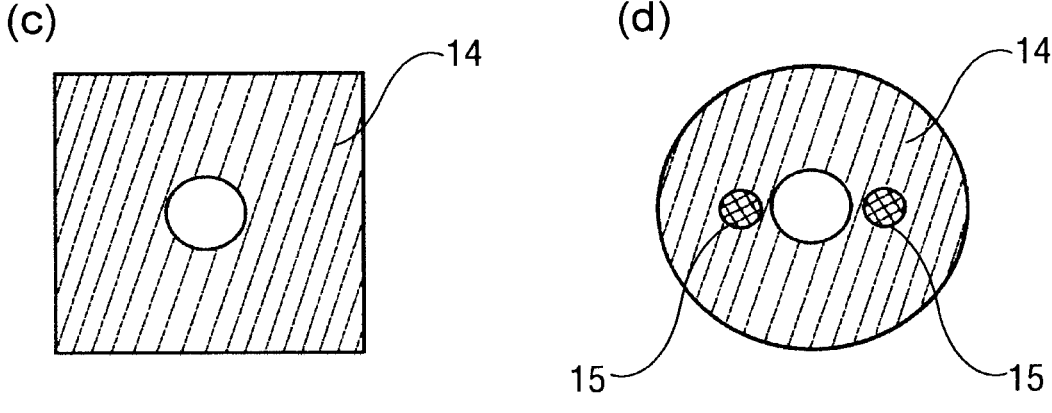
Figure 5:
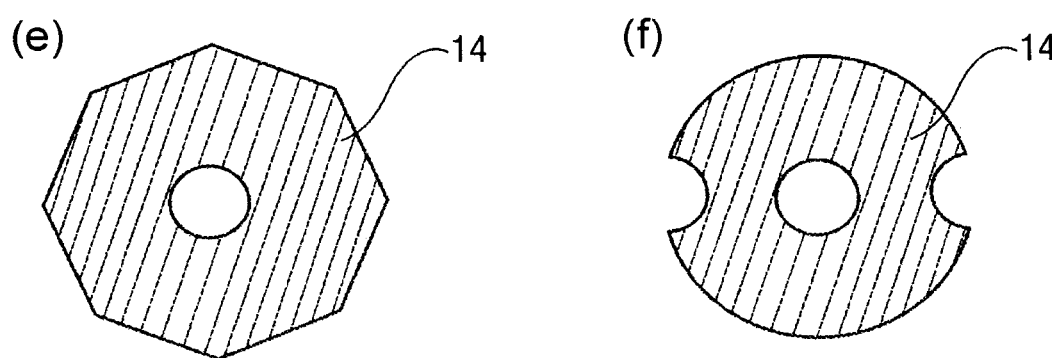

Preferably, at least one reflective cladding in a cross-section perpendicular to the axis of the optical fiber 1 is radially asymmetric. FIG. 5 *b, c, d, e, g* show possible embodiments of the radially asymmetric reflective shell 14: the truncated ring (FIG. 5*b*), the square (FIG. 5*c*), inserts 15 made of a material having at least one of the properties: the coefficient of thermal expansion other than the coefficient of thermal expansion of the cladding material; the refractive index different from the refractive index of the cladding (FIG. 5*d*), the octagon (FIG. 5*e*), the circle with recesses

11

12

(FIG. 5f). Preferably, at least one of the inner reflective claddings of the optical fiber, for example, the cladding 3 of the optical fiber 1, has such a shape.

Preferably, one of the reflective claddings 14 of the optical fiber 1 comprises elements having the coefficient of thermal expansion (CTE) different from the CTE of the material of the reflective cladding 14 (FIG. 5d).

Figure 6:
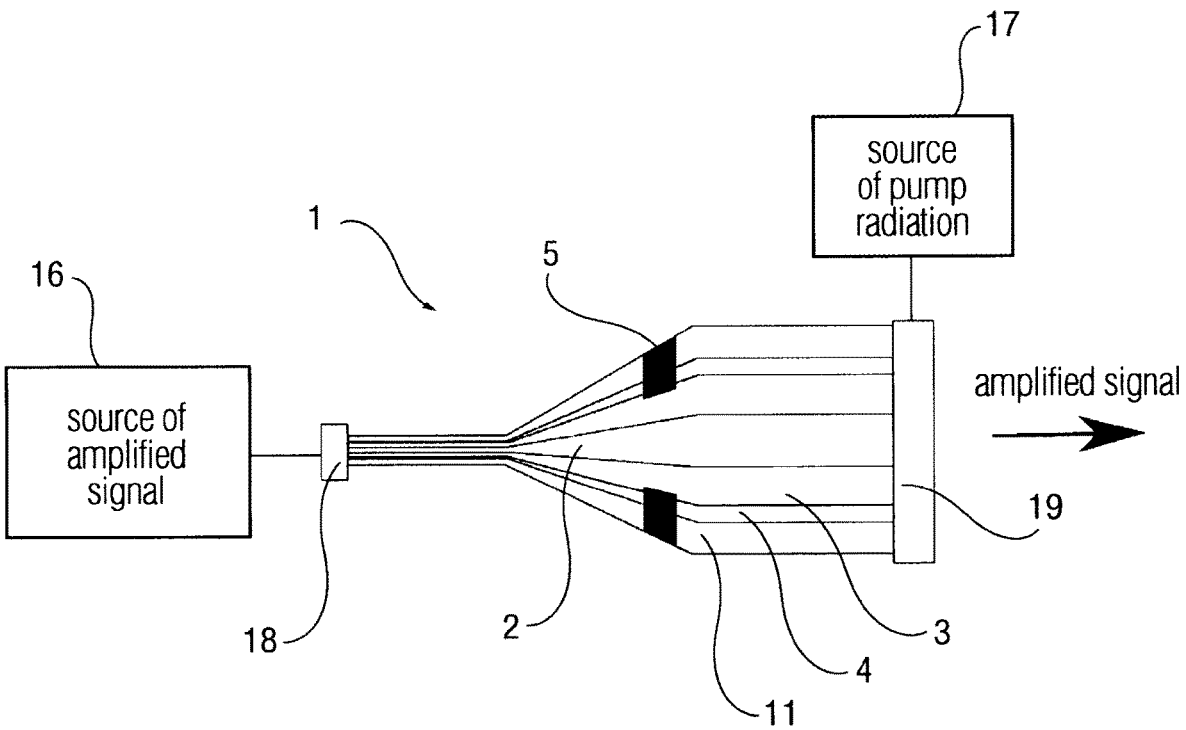
FIG. 6 shows a scheme of the optical radiation amplifier based on the active optical fiber with the modified section in the reflective cladding.

According to the invention, an optical amplifier is proposed (FIG. 6), the optical amplifier comprises the optical fiber 1, the source 16 of the amplified signal, the pump radiation source 17, the device 18 for coupling/decoupling of the radiation of the signal to the core, located at the thin end 10 of the optical fiber 1, the device 19 for output of the amplified signal and input of the pump radiation at the thick end 9 of the optical fiber 1 to the core 2 and to the reflective cladding 3 adjacent to the core 2.

In some implementations, the device 18 can also be used to couple the radiation of an additional pump source (not shown) into the core 2 and the reflective cladding 3 of the optical fiber at the thin end.

In some implementations, the optical fiber 1 may have more than two reflective claddings (not shown), in which case the device 19 can be used to couple the pump radiation into the second and any other reflective cladding except the outer one.

The device 19 can be implemented either using lenses and mirrors, or using fiber-optic elements, for example, an all-fiber pump and signal combiner, wherein said combiner is spliced to the output end of the optical fiber 1, or formed near the output end of the optical fiber 1 on its side surface.

Figure 7:
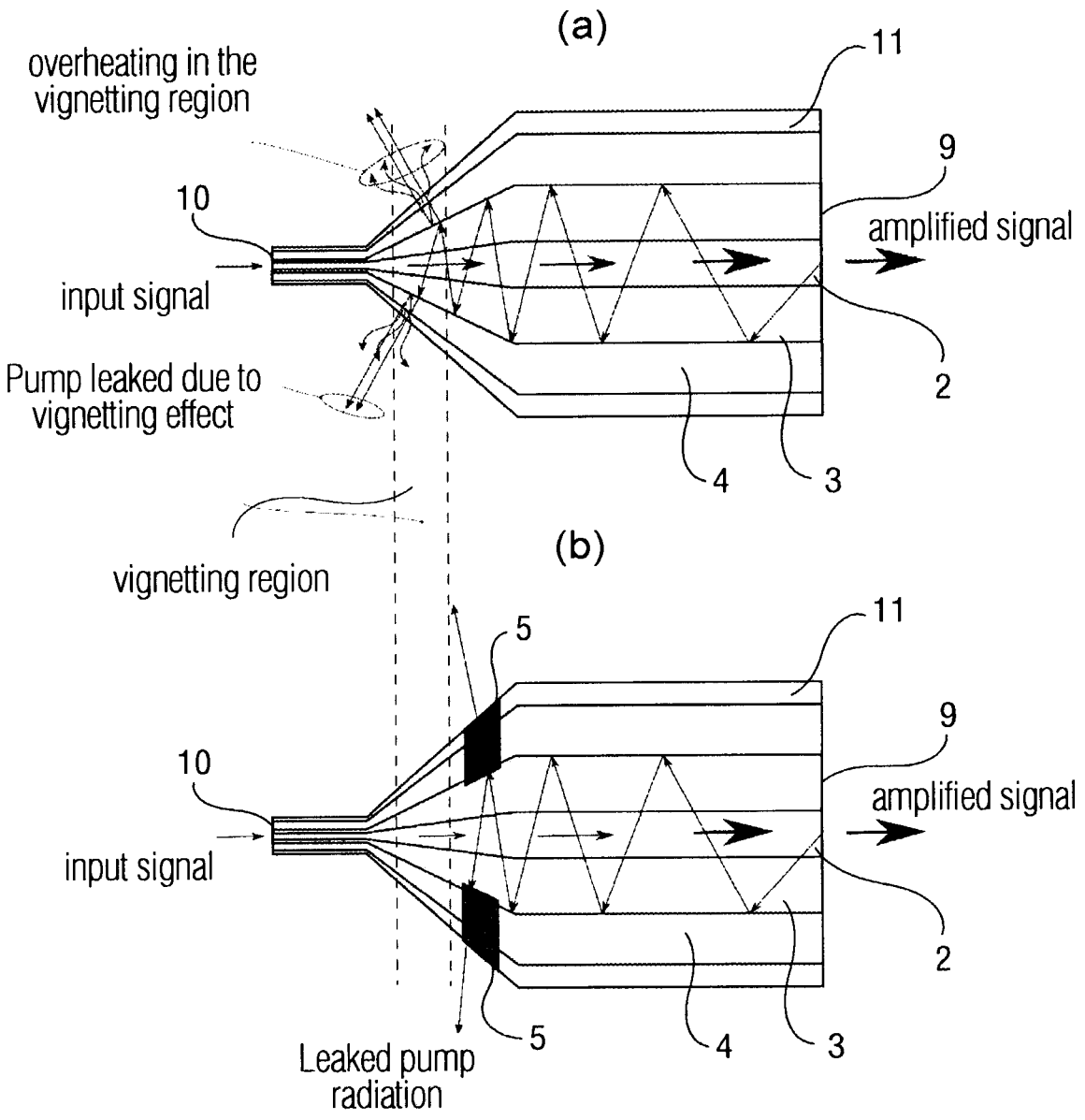
FIG. 7 shows a scheme of signal transmission and pump radiation in the optical fiber (FIG. 7 *a*) and in the optical fiber containing the modified section (FIG. 7 *b*), explaining the operational principles of the optical fiber.

Operation of the optical fiber known from prior art is shown in FIG. 7a. The signal radiation is coupled at the side of the thin end 10 and propagates towards the thick end 9. The pump radiation is coupled at the side of the thick end 9, and as the pump propagates towards the thin end 10, the pump radiation aperture increases according to the law $$NA(z) = NA_{input} \cdot \sqrt{S^{input}/S(z)},$$

where:

NA (z) is the pump numerical aperture at the point with the z coordinate along the optical fiber axis; S(z) is the total cross-sectional area of the core 2 and the adjacent reflective cladding 3 at the specified point; $S^{input}$ is the total cross-sectional area of the core and the adjacent reflective cladding at the pump radiation input point; $NA_{input}$ is the pump radiation numerical aperture coupled at the thick end. The pump radiation reaches the region of the optical fiber where the vignetting effect occurs, the presence of the vignetting effect is determined by the condition:

$$NA(Z) = \sqrt{(n_{1clad})^2 - (n_{2clad})^2},$$

where Z is the position along the optical fiber axis of the region where the vignetting effect occurs, $n_{1clad}$ is the refractive index of the first reflective cladding, and $n_{2clad}$ is the refractive index of the second reflective cladding.

As stated in the description of prior art, the vignetting effect in the specified region of the known optical fiber is that the pump radiation begins to leak into the second reflective cladding and into the outer protective coating due to violation of the condition of the total internal reflection for the part of the pump radiation having the maximum numerical aperture.

If the design of the known optical fiber comprises a number of reflective cladding that is greater than two (not shown), then the condition for the appearance of the vignetting effect becomes:

$$Spenult(Z) < Spenult^{input} \cdot \frac{(NA_{input})^2}{(n_{penult})^2 - (n_{last})^2},$$

where Spenult(Z) is the total cross-sectional area of the core and all reflective claddings except the outer reflective cladding in the area with the Z coordinate along the optical fiber axis, where the vignetting effect takes place, $Spenult^{input}$ is the total cross-sectional area of the core and all reflective claddings except the last one at the coupling site of the pump radiation, $n_{last}$ is the refractive index of the outer reflective cladding, $n_{penult}$ is the minimum of the refractive indices of the reflective claddings into which the pump is coupled, for example, if the pump is coupled into all reflective claddings except the outer one, then $n_{penult}$ is the refractive index of the reflective cladding adjacent to the inner side of the outer reflective cladding.

The pump radiation that leaked into the outer reflective cladding, into the cladding 4 in the described embodiment, is absorbed in the cladding 4, as well as in the protective coating 11, and in addition, in the materials surrounding the optical fiber 1, for example, in a spool on which the optical fiber is wound (not shown), which leads to heating of both the optical fiber 1 itself and the surrounding materials. With an increase in the pump radiation power, the heating increases and when the critical temperature is reached the properties of the fiber degrade and total destruction in the region occur after a while.

The optical fiber 1 according to the present invention (FIG. 7b), there is a modified section 5 in one of the reflective claddings, which allows a controlled reduction in power of the pump radiation propagating in the reflective cladding 3 and preserves the optical fiber characteristics. The position of at least one modified section 5 is selected so that it is located between the thick end of the optical fiber 9, through which the pump radiation is coupled, and the region where the vignetting effect occurs. In that way, the pump radiation power, reaching the area where the vignetting effect takes place, is reduced, which provides significantly less heating of the optical fiber in this area and due to this, there is no destruction of the optical fiber due to overheating in the vignetting area.

It should be noted that the exact position along the axis of the optical fiber 1 of the area where the vignetting effect takes place depends on the initial numerical aperture of the pump radiation coupled into the optical fiber, and therefore depends on the design of the amplifier, therefore, in general, regardless the design of the amplifier, the position along the axis of the optical fiber, where the modified region should be located, is determined by the condition:

$$1.5 \times S^{min} < S^{int} \leq S^{max}$$

where: $S^{min}$ is the minimum total cross-sectional area of the core and the reflective cladding adjacent to the core, $S^{max}$ is the maximum total cross-sectional area of the core and the reflective cladding adjacent to the core, and $S^{int}$ is the total cross-sectional area of the core and the reflective cladding adjacent to the core in the part of the optical fiber where the modified region is located.

In applications requiring high peak power, the presence of the modified section allows to reduce the pump power propagating in the part of the fiber that has the smallest cross-sectional area of the core and, thereby, reduce the amount of signal gain in this part of the fiber.

Figure 8:
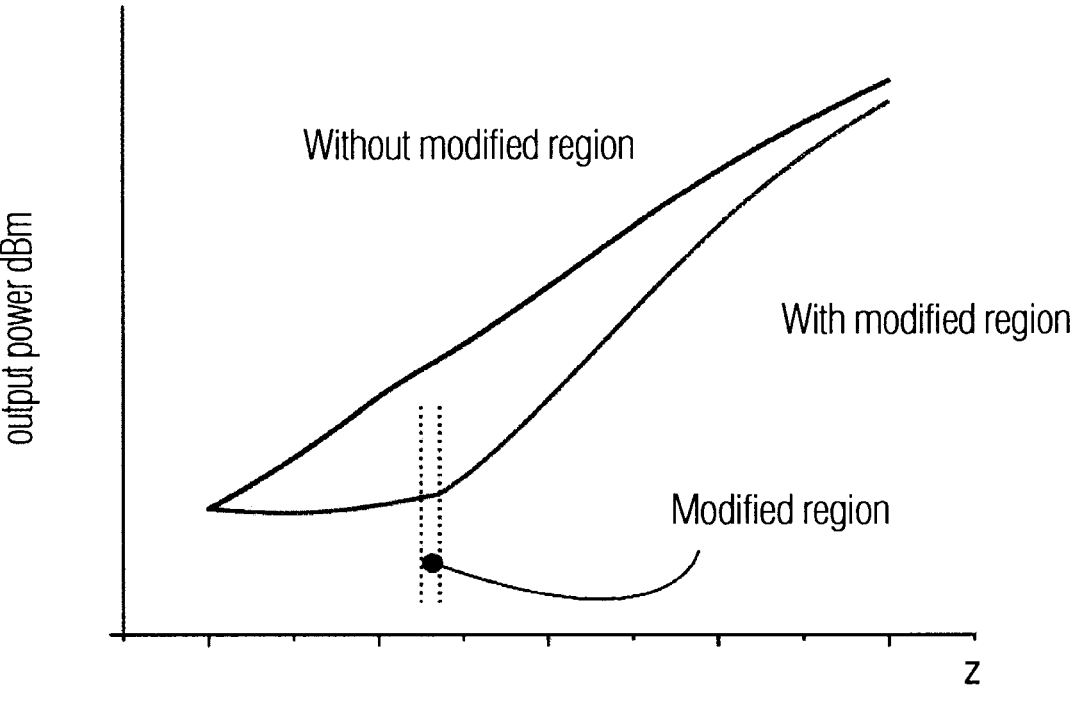
FIG. 8 shows the signal gain profile in the fiber when the optical losses for the pump radiation propagating in the reflective cladding adjacent to the core in the modified section exceed 0.5 dB (lower curve), and when they are equal to zero (upper curve), according to the invention.

FIG. 8 shows the distribution of the average power of the amplified signal along the length for the optical fiber known from prior art (upper curve) and for the optical fiber according to the present invention, which has the modified region in the optical fiber that provides optical losses for pump radiation exceeding 0.5 dB (lower curve). In the latter case, the signal amplification mainly occurs in the part of the fiber with an increased cross-sectional area of the core, which reduces the nonlinear effects impact on the amplified signal.

As a consequence, the threshold of nonlinear effects is reached at a higher level of average (in the case of continuous-wave signal amplification) or peak (in the case of pulse signal amplification) output power, which allows one to increase the maximum achievable average or peak power at the output of the fiber while maintaining the quality of the output radiation, for example, the width of the spectrum of the amplified radiation.

Figure 9:
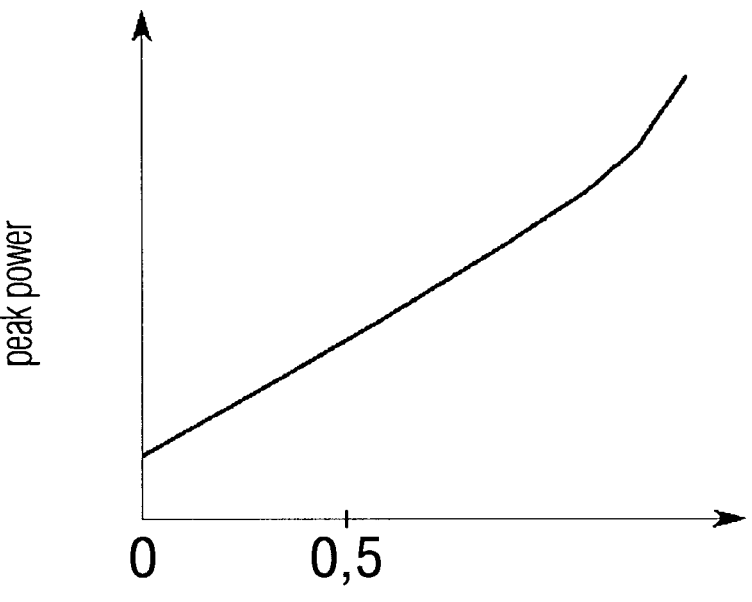
FIG. 9 shows the dependence of the maximum achievable peak power in the optical fiber (at a fixed input level and form of a signal) as a function of the amount of optical losses introduced by the modified section.

FIG. 9 shows the dependence of the maximum achievable peak power on the value of optical losses for the pump radiation in the modified region.

Figure 10:
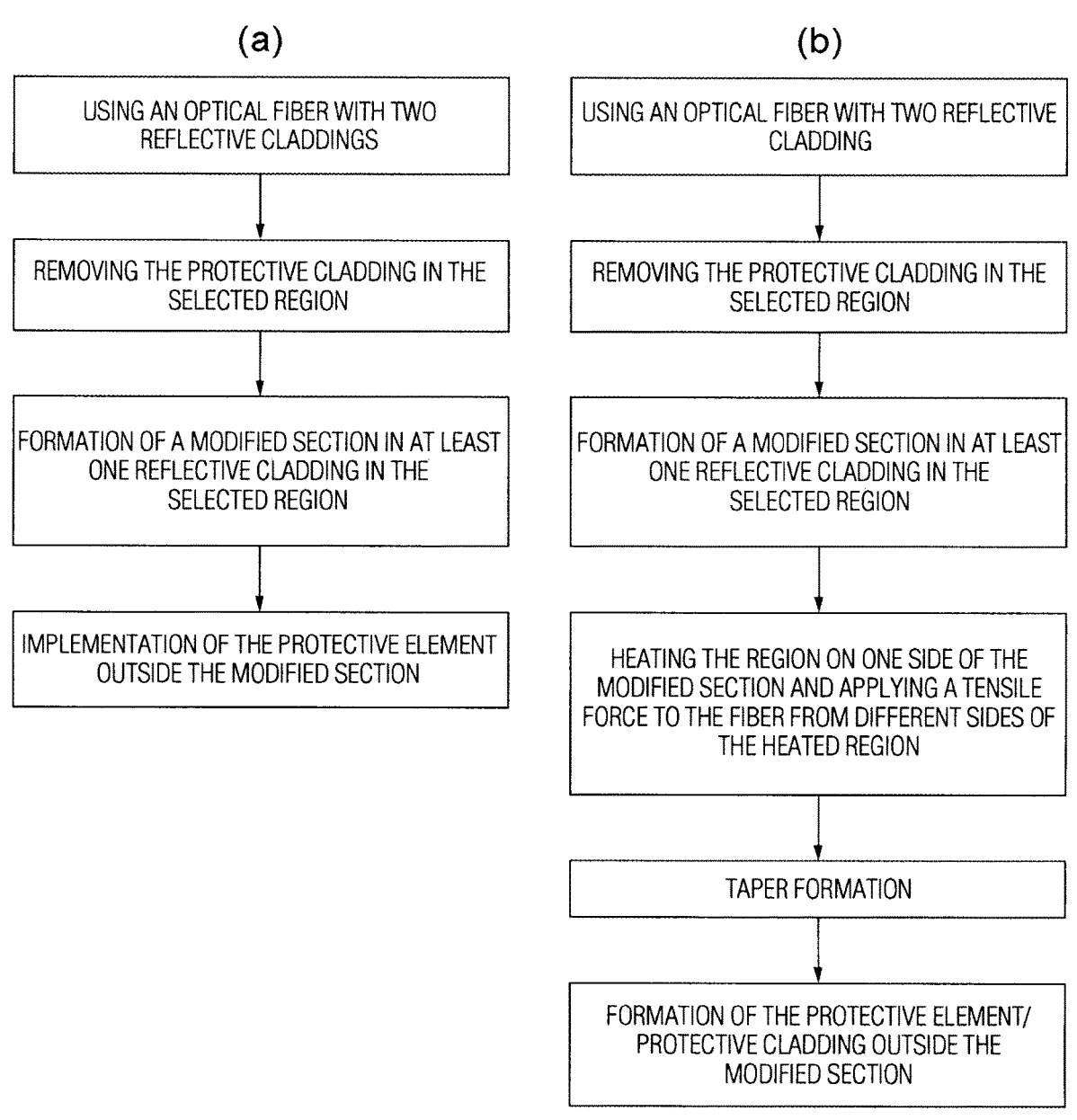
FIG. 10 *a, b* show block diagrams of the sequence of steps for performing two methods for manufacturing the optical fiber.

Preferably at least one modified section of the reflective cladding (not shown in Figures) of the said modified sections is located at the thin end of the optical fiber, in the area where the total cross-sectional area $S^{int}$ of the core and the reflective cladding adjacent to the core satisfies the following condition: $S^{int} \leq 1.5 \times S^{min}$ The method of manufacturing of the optical fiber according to the first embodiment (FIG. 10 $a$) is carried out as follows.

An optical fiber 1 comprising the active core 2 and the at least two reflective claddings 3 and 4 is used, the cross-sectional area of the core and the cross-sectional area of the reflective cladding 3 adjacent to the core continuously change along the length of the optical fiber so that the maximum total area Smax of the cross-sectional area of the core and the reflective cladding is at least twice as large as the minimum total area $S^{min}$ of the cross-sectional area of the core and the reflective cladding.

The method for manufacturing the active optical fiber comprises the following steps.

The region along the axis of the optical fiber is being selected, where the total area Sint of the cross-section of the core and the reflective cladding adjacent to the core satisfies the following condition: $1.5 \times S^{min} \leq S^{max}$.

If there is a protective coating, it should be removed in the selected region of the optical fiber.

At least one section of at least one reflective cladding of the optical fiber is modified in the selected region to ensure a decrease in the pump radiation power propagating along the optical fiber in at least one reflective cladding after passing through the modified section.

The modification is carried out by of one of:

creation of optical defects in the reflective cladding that ensure the scattering of the propagating radiation; or removal a part of the reflective cladding and applying a material having the refractive index greater than the refractive index of the reflective cladding to the part where the reflective cladding is removed; or removal a part of the reflective cladding and applying a material absorbing the pump radiation to the part where the reflective cladding is removed.

Then a protective coating for at least one of the modified section is formed, designed to protect the modified section from mechanical damage and from overheating by removing the heat generated by the absorption of optical radiation in the region of the at least one modified section and in the region of the protective coating of the at least one modified section.

The method of manufacturing the optical fiber according to the second embodiment (FIG. 10$b$) is carried out as follows.

An optical fiber comprising the active core and the at least two reflective claddings is used.

A region along the length of the optical fiber between the ends of the optical fiber is selected and at least one of the following: a protective coating, one of the at least two reflective claddings is removed in the selected region.

At least one section of at least one reflective cladding is modified by one of:

creating optical defects in the reflective cladding that provide scattering of the propagating pump radiation; or removal of the reflective cladding and applying a material having the refractive index lager than the refractive index of the reflective cladding to the part where the reflective cladding is removed; or removal of the reflective cladding and applying a material absorbing the pump radiation to the part where the reflective cladding is removed.

The optical fiber is heated up to softening on one side of the region, where the modification is implemented.

A mechanical force is being applied to the ends of the optical fiber and thus forming a section having a variable diameter, so that the diameter of the core and the diameter of the reflective cladding adjacent to the core continuously change along the length of the section, so that the cross-sectional area of the core and the reflective cladding adjacent to the core at one end of the section is at least twice the cross-sectional area of the core and the reflective cladding adjacent to the core at the other end of the section.

Performing at least one of the following: restoring the protective coating in the region of the optical fiber; creating a protective element in the region of the optical fiber to protect against mechanical damage and to remove heat.

INDUSTRIAL APPLICABILITY

Active optical fiber with continuously changing cross-sectional area can be used in optical signal amplifiers, in fiber lasers, which are used in industry, medicine and fundamental research due to the high quality of the output radiation, compact size, maintenance-free operation and relatively low price.

The invention claimed is:

1. An active optical fiber comprising an active core doped with at least one active element selected from a group consisting of elements: erbium, ytterbium, thulium, neodymium, holmium, praseodymium, dysprosium, bismuth; and at least two reflective claddings;

the cross-sectional area of the core and the cross-sectional area of the reflective cladding adjacent to the core vary along the length of the active optical fiber so that the maximum total area $S^{max}$ of the cross-sectional area of the core and the reflective cladding is at least twice as large as the minimum total area $S^{min}$ of the cross-sectional area of the core and the reflective cladding;

at least one reflective cladding of said at least two reflective claddings comprises at least one modified section configured to reduce the power of the pump radiation propagating along the active optical fiber in said at least one reflective cladding after passing the at least one modified section;

the at least one modified section of the reflective cladding is located in that region along the axis of the optical fiber where the total area $S^{int}$ of the cross-section of the core and the reflective cladding adjacent to the core satisfies the following condition:

$$1.5 \times S^{min} < S^{int} \leq S^{max}.$$

2. The active optical fiber according to claim 1, wherein the reflective cladding located on the modified section has the refractive index higher than the refractive index of the rest of the reflective cladding.

3. The active optical fiber according to claim 1, wherein at least one modified section of the reflective cladding comprises an optical inhomogeneity that ensures the scattering of the radiation propagating through the reflective cladding.

4. The active optical fiber according to claim 1, wherein the modified section extends along the axis of the optical fiber and said modified section is located in cross-section along at least a part of the perimeter of the reflective cladding and occupies at least a part of the section of the reflective cladding in at least one local region.

5. The active optical fiber according to claim 1, wherein the at least one modified section is located at each of the ends of the fiber at a distance of more than 3 cm.

6. The active optical fiber according to claim 1, wherein the core is configured to maintain the propagation of the single optical transverse mode at said one of the ends.

7. The active optical fiber according to claim 1, further comprising an external protective coating made of a material such as a polymer, metal or carbon.

8. The active optical fiber according to claim 1, further comprising a protective element located on the outer side of the region of the reflective cladding comprising the modified section, said protective element is configured to protect the modified section from mechanical damage and/or from overheating by removing the heat released during the absorption of pumping radiation by the modified section and the outer protective coating.

9. The active optical fiber according to claim 1, wherein the at least one reflective cladding is radially asymmetric in a cross-section perpendicular to the axis of the fiber.

10. The active optical fiber according to claim 1, wherein one of the reflective claddings comprises elements having the coefficient of thermal expansion (CTE) that differs from the CTE of the material of the reflective cladding adjacent to the core.

11. A method for manufacturing the active optical fiber of claim 1, comprising the steps of:

using an optical fiber comprising the active core and at least two reflective claddings, whereas the cross-sectional area of the core and the cross-sectional area of the reflective cladding adjacent to the core are continuously changing along the length of the optical fiber so that the maximum total area $S^{max}$ of the cross-sectional area of the core and the reflective cladding is at least twice as large as the minimum total area $S^{min}$ of the cross-sectional area of the core and the reflective cladding, selecting an area along the axis of the optical fiber where the total area $S^{int}$ of the cross-section of the core and the reflective cladding adjacent to the core satisfies the following condition:

$$1.5 \times S^{min} < S^{int} \leq S^{max},$$

modifying at least one section of the at least one reflective cladding of the fiber in the specified section to ensure the reduction of the power of the pump radiation propagating along the optical fiber in the at least one reflective claddings after passing the modified section, forming a protective coating for the at least one modified section, said protective coating is configured to protect said modified section from a mechanical damage and from overheating by removing the heat generated by the absorption of optical radiation in the area of the at least one modified section and in the area of the protective coating of the at least one modified section.

12. The method according to claim 11, wherein the step of modifying is carried out by one of the following:

forming optical defects in the reflective cladding to ensure a scattering of the propagating radiation;

removing the reflective cladding and applying a material to the removal site, whereas the material having the refractive index greater than the refractive index of the reflective cladding;

removing the reflective cladding and applying a material to the removal site, whereas the material serves for absorbing the pump radiation.

13. The method for manufacturing the active optical fiber of claim 11, comprising the steps of:

using the optical fiber comprising the active core and the at least two reflective claddings, selecting an area along the length of the optical fiber between the ends of the optical fiber, removing one of the protective coatings or at least one of the at least two reflective claddings in the selected region, modifying at least one section of at least one reflective cladding in the said region of the optical fiber by one of:

creating optical defects in the said reflective cladding, said defects provide scattering of the propagating pump radiation;

removing the reflective cladding, and applying a material having the refractive index greater than the refractive index of the said reflective cladding in the removed site;

removing the reflective cladding and applying the material absorbing the pump radiation to the removed site, heating up the optical fiber on the one side of the selected region where the modified section is formed to the softening, applying a mechanical force to the ends of the optical fiber and forming a section with a changing diameter, so that the diameter of the core and the diameter of the reflective cladding adjacent to the core is continuously changed along the length of the section so that the cross-sectional area of the core and the reflective cladding adjacent to the core, from one end of the section is at least twice the cross-sectional area of the core and the reflective cladding adjacent to the core at the other end of the ion, performing at least one of the following:

restoring the protective coating in the said region of the optical fiber;

creating a protective element in the said region of the optical fiber to protect the optical fiber against mechanical damage and to remove heat.

14. The optical signal amplifier comprising
the optical fiber according to claim 1,
a seed source of the signal to be amplified,
a source of pump radiation, means for coupling/decoupling of the radiation of the
amplified signal to the core located on both sides of the
fiber, means for coupling the pump radiation to the core and/or
the reflective cladding adjacent to the core of the
optical fiber, located at least at one end of the optical
fiber.

15. The active optical fiber according to claim 1, in which
at least one modified section of the reflective cladding of the
said modified sections is located at the thin end of the optical
fiber, in the area where the total cross-sectional area $S^{int}$ of
the core and the reflective cladding adjacent to the core
satisfies the following condition: $S^{int} \leq 1.5 \times S^{min}$.

\* \* \* \* \*